Sept. 26, 1961   J. PICKLES   3,001,424
PRESSURE ROLLERS
Filed May 25, 1959

INVENTOR:
John Pickles
BY
Pierce, Scheffler & Parker
Attorneys

United States Patent Office 3,001,424
Patented Sept. 26, 1961

3,001,424
PRESSURE ROLLERS
John Pickles, Huddersfield, England, assignor to Carding Specialists (Canada) Limited, Toronto, Ontario, Canada, a corporation of Canada
Filed May 25, 1959, Ser. No. 815,699
Claims priority, application Great Britain June 5, 1958
4 Claims. (Cl. 80—56)

This invention relates to pressure rollers and particularly to means for applying a load to at least one roller of a roller assembly. The invention is also particularly, but not exclusively, applicable to the pressure roller assembly disclosed in the specification of British Patent No. 697,106, and my co-pending application Serial No. 815,700 filed May 25, 1959.

Various types of pressure-applying means are known for applying a load to a roller and in some cases the pressure is applied hydraulically or by spring pressure or by mechanical means and often such pressure is adjustable at will. It is customary to apply the pressure equally on the ends of the roller.

The main object of the present invention is to provide simple but efficient mechanical pressure-applying means for applying a required load to the ends of the roller.

Accordingly there is provided pressure-applying means for loading a roller having its shaft ends movably guided, said means comprising a pair of pivotal double-ended members each member having one end engaging a guided ball which in turn is adapted to apply a load to the adjacent roller shaft, and the other end of the pivotal member having an extension arm carrying a weight exerting leverage through the member on the ball, whereby multiplied pressure is applied to the balls and thus the roller through its shaft ends.

The balls may engage flat faces, or annular or curved faces provided co-axially on the shaft ends, and the balls be engaged by curved or flat faces formed on the pivotal members.

Each pivotal member may be disposed with one part substantially vertical and have its horizontal fulcrum axis off-set laterally from the centre of the ball the member engages and towards the loading means. Moreover, the weight may extend between, or be attached to means common to, both the extension arms and be adjustable for alteration of the loading. A common weight may be mounted on the arms to have self-adjustment.

The invention will now be more particularly described with reference to the accompanying drawings in which.

Figure 1:
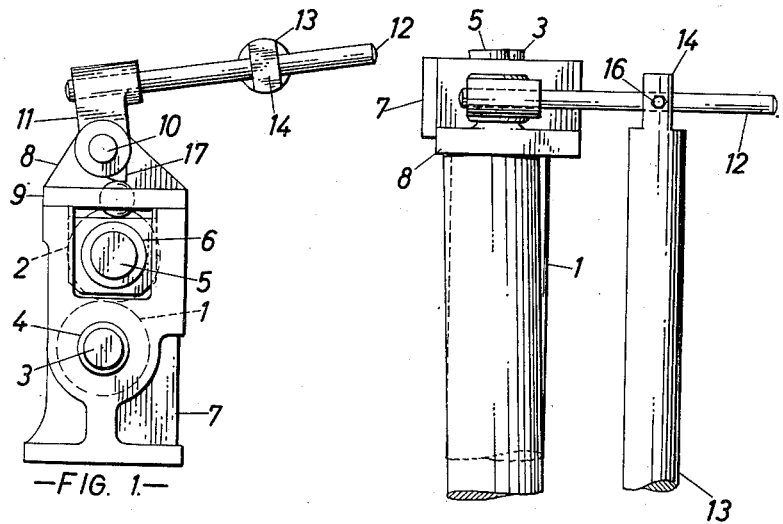
FIG. 1 is an end elevation of the pressure-applying means in co-operation with a pair of pressure-applying rollers.
Figures 2, 3:
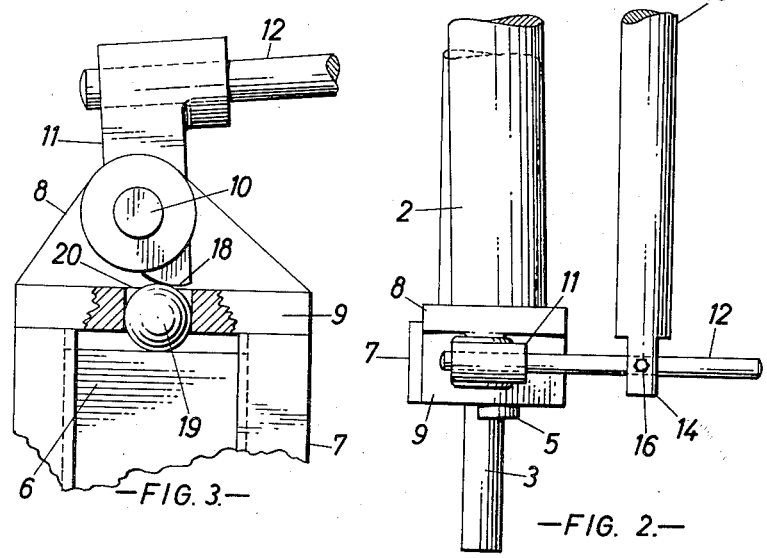
FIG. 2 is a plan view of the pressure-applying means.
FIG. 3 is an enlarged detail of one double-ended member engaging a guided ball.
Figure 4:
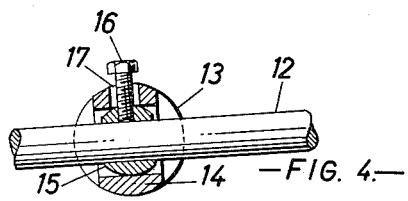
FIG. 4 is an enlarged detail in section of one end of the loading weight.

In the illustrated embodiment of this invention for a machine having a pair of pressure rollers 1, 2, the lower roller 1 has its shaft ends 3 mounted in fixed bearings 4 and the upper roller 2 has its shaft ends 5 in guided bearings 6 capable of vertical movement. In the construction shown, particularly in FIG. 2, the top roller 2 is set longitudinally at a predetermined angle to the axis of the lower roller 1. The invention also applies to parallel rollers and to assemblies of more than two rollers or a single roller bearing on to a plate or other member.

Such bearings 4, 6 at each end are carried by a common mounting bracket 7 and each bracket carries a top bracket 8 for the pressure-applying means. Such top bracket has a bottom plate 9 secured down on to the bearing bracket and its upstanding part is furnished with a horizontal pivot pin 10 on which is mounted a double-end member 11 acting in the manner of a bell-crank lever. Each double-ended member has a part extending upwardly furnished with a horizontal boss into which is secured a rod-like arm 12 normally projecting substantially horizontally, e.g. slightly upwardly as shown to clear a machine part. Each arm requires loading and conveniently the two arms extending parallel with one another carry a common weight 13 in the form of a transverse bar which is slidably adjustable along the length of the arms for adjusting the loading. To allow for any inaccuracy between the angular positions of the two arms 12, the bar-weight 13 has slotted ends 14 (they may be bifurcated) each mounted on an arm 12 through a swivel bearing 15 for the weight to be self-adjusting. Means are provided for holding the weight in its set position and conveniently comprise set screws 16 passing through a hole 17, with adjusting clearance to be screwed through the bearing and tightened on to arm 12. Alternatively the arms may be adjustably mounted in the double-ended members. The lower part of each double-ended member is shorter than the upwardly-extending part and terminates in a bottom face 18, curved in one direction, the centre of which is off-set from the axis of the pivot pin 10, of the double-ended member, on the side nearest to the loading weight 13. This face 18 of the double-ended member rests upon a ball 19 located in a vertical hole 20 through the bottom plate 9 of the pivot bracket 8 so that the ball is guided for vertical movement. Each ball rests upon the top edge of the bearing 6 for the top roller shaft end. Alternatively, the ball may engage the shaft end, or a collar formed on, fixed to, or rotatable upon, the shaft end. The ball may rest upon a curved surface of the shaft bearing 6, or some other part affecting the roller.

With the above arrangement the distance between the weight 13 and the double-ended member pivot 10 in ratio to the distance between the pivot and the lower ball engaging face 18 of the member in conjunction with the actual weight will detremine the load applied through the ball 19 on the shaft end 3 or its bearing 6. Thus, say the weight is twenty pounds and the ratio ten to one, the loading pressure applied through the ball will be two hundred pounds. It will be appreciated this loading pressure is merely given as an example as the ratio and actual weight can be varied at will. Also, instead of employing a common weight 13 extending between and mounted on the two receiving arms 12, the latter may be connected together and a central arm with an adjustable weight provided.

The pressure-applying means may be modified without departing from the scope of the invention which comprises simple but efficient mechanical pressure-applying means wherein a relatively light weight can be multiplied by leverage and the disposition of a fulcrum to give a required loading on the ends of the roller.

What I claim is:

1. Pressure-applying means for loading a roller having its shaft ends movably guided, said means comprising a pair of pivotal double-ended members, each said member having one end engaging a guided ball, said ball being adapted to apply a load to the adjacent roller shaft, the other end of each pivotal member having an extension arm, and a weight member extending between and common to both of said extension arms, said weight member being adjustable to like positions along said extension arms for exerting like leverage through said two pivotal members on said guided balls, whereby multiplied pressure is applied to said balls and thus said roller through its shaft ends.

2. Pressure-applying means as defined in claim 1 wherein the ends of said common weight member are secured to their respective extension arms by means including a swivel bearing.

3. Pressure-applying means as defined in claim 2 and which further includes a set screw passing through a hole in each end of said weight member with clearance and which is screwed through said swivel bearing to engage the surface of the corresponding extension arm which passes through said swivel bearing.

4. Pressure-applying means as defined in claim 1 wherein each said end of the pivotal double-ended member which engages said guided ball has a curved cam surface which is curved in a plane upwardly away from its loaded side to produce a cam action.

References Cited in the file of this patent

UNITED STATES PATENTS

| 139,246 | Hinkley | May 27, 1873 |
| 334,044 | Pedder | Jan. 12, 1886 |
| 412,082 | Forsyth | Oct. 1, 1889 |
| 492,132 | Bessonette | Feb. 21, 1893 |
| 922,512 | Richards | May 25, 1909 |
| 1,469,726 | Keck | Oct. 2, 1923 |

FOREIGN PATENTS

| 150,437 | France | Aug. 2, 1882 |
| 19,176 | Great Britain | Oct. 25, 1892 |
| 25,073 | Norway | Oct. 5, 1914 |